(12) United States Patent
Chatow et al.

(10) Patent No.: US 8,792,120 B2
(45) Date of Patent: Jul. 29, 2014

(54) SYSTEM AND METHOD FOR ACQUIRING DOCUMENT SERVICES

(75) Inventors: Ehud Chatow, Palo Alto, CA (US); Kay-Yut Chen, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 355 days.

(21) Appl. No.: 13/255,230

(22) PCT Filed: Mar. 9, 2009

(86) PCT No.: PCT/US2009/036562
§ 371 (c)(1),
(2), (4) Date: Sep. 7, 2011

(87) PCT Pub. No.: WO2010/104501
PCT Pub. Date: Sep. 16, 2010

(65) Prior Publication Data
US 2012/0002241 A1  Jan. 5, 2012

(51) Int. Cl.
*G06F 3/12* (2006.01)
*G06K 15/00* (2006.01)
*H04N 1/00* (2006.01)

(52) U.S. Cl.
USPC .......... 358/1.15; 358/1.1; 358/1.16; 358/402; 358/403

(58) Field of Classification Search
USPC ......... 358/1.15, 487, 408, 442, 1.1, 402, 403, 358/407, 468, 1.13, 1.11, 1.14, 1.16; 709/201, 206, 218, 207, 223, 238, 202, 709/203, 217; 705/27.1, 37, 6, 26.4, 400, 705/40, 35
See application file for complete search history.

(56) References Cited

U.S. PATENT DOCUMENTS

| | | |
|---|---|---|
| 4,839,829 A | 6/1989 | Freedman |
| 5,287,194 A | 2/1994 | Lobiondo |
| 5,826,244 A | 10/1998 | Huberman |
| 6,078,906 A | 6/2000 | Huberman |
| 6,330,542 B1 | 12/2001 | Sevcik et al. |
| 6,529,286 B1 | 3/2003 | King |
| 6,687,018 B1 | 2/2004 | Leong et al. |
| 6,801,333 B1 * | 10/2004 | Weiss ............................ 358/1.15 |
| 6,980,964 B1 | 12/2005 | Cocotis et al. |
| 7,031,929 B1 | 4/2006 | Button et al. |
| 7,225,220 B2 * | 5/2007 | Gonzalez et al. ............. 709/202 |
| 7,225,230 B1 * | 5/2007 | Knoerle et al. ............... 709/206 |
| 7,249,085 B1 | 7/2007 | Kinney, Jr. et al. |
| 7,415,435 B1 * | 8/2008 | Weiss et al. ..................... 705/37 |
| 2003/0195813 A1 | 10/2003 | Pallister et al. |
| 2005/0094201 A1 * | 5/2005 | Gecht et al. .................. 358/1.15 |
| 2008/0270358 A1 | 10/2008 | Chatow et al. |

OTHER PUBLICATIONS

International Search Report and Written Opinion for PCT/US2009/036562 dated Nov. 30, 2009 (10 pages).

* cited by examiner

*Primary Examiner* — Ngon Nguyen (57) ABSTRACT

A system and method for acquiring document services is disclosed.

15 Claims, 6 Drawing Sheets

| | | | BID INTERFACE | | | | |
|---|---|---|---|---|---|---|---|
| ENTITY | VOLUME | GEOGRAPHIC LOCATION | DELIVERY TIME | OPTIONAL PSP ATTRIBUTES | PRICE SCHEDULE | | |
| PSP-A | 20,000 | 1 | 24 HRS | A,C | 20 | 17 | |
| PSP-A | 10,000 | 2 | 3 DAYS | C,E | 15 | 14 | |
| PSP-A | 50,000 | 1,3 | 2 WEEKS | B,D | 10 | 8 | |
| PSP-B | 30,000 | 2,4 | 10 DAYS | A,C,E | 13 | 11 | |
| PSP-B | 20,000 | 3 | 2 WEEKS | A,E | 11 | 8 | |
| PSP-B | 30,000 | 3 | 3 WEEKS | B | 9 | 7 | |

Fig. 8

SYSTEM AND METHOD FOR ACQUIRING DOCUMENT SERVICES

BACKGROUND

Many consumers are accustomed to printing documents at home or work to a printer that is nearby their computer. However, with the advent of mobile computing and the explosion of digital information, more consumers are obtaining document services from a local document services provider. These services may be obtained directly in person or are increasingly being met via the internet through a retail web site geared to provide printing and document services. A consumer can make a document service request and expect to receive the requested documents near their present location, whether at home or not. Moreover, even businesses may obtain larger volume document services through a web site or another electronic venue with the documents being provided by the service provider and delivered to the business or location at which an employee of the business is located.

To meet this growing demand, some large entities in the printing market may contract with document service providers to secure their services for large volumes of printing or other document services.

Unfortunately, the typical contracts that govern the relationship between these large entities and the document service providers are not flexible enough to accommodate the fast pace and variability of demand in the overall printing market. For example, if the contract specifies an annual volume based on non-peak demand, the contracted volume will be inadequate for periodic peak demands. On the other hand, if the contract specifies an annual volume based on peak demand, the contracted volume will be too high for non-peak demand periods. Finally, in the absence of such contracts, there may be insufficient stability in the printing market to insure quality service over a longer time frame. Accordingly, the conventional models to acquire services from multiple print service providers are inadequate to serve current printing demands and models.

DETAILED DESCRIPTION

In the following detailed description, reference is made to the accompanying drawings which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Embodiments of the present disclosure provide a system and method for acquiring document services. In general terms, the system and method provide a mechanism for a print director to obtain favorable terms for a spot volume of printing (or document services) from a set of document service providers that are already in relationship with the print director. In one aspect, the spot volume is in addition to a base volume of document services that have already been contracted between the print director and the document service providers.

In one embodiment, the mechanism comprises a bidding system operated by the print director or a surrogate of the print director. In the bidding system, the print director requests that a spot volume of printing documents be met at one or more price levels set by the print director and within a time frame set by the print director. One or more pre-authorized document service providers bid on the spot volume job according to non-price parameters such as job specific constraints and/or voluntary (e.g. optional) document or printing features offered by the service provider. In addition to the job specific criteria, each bidding service provider also qualifies to make a bid by meeting mandatory attributes (such as core capabilities of the service provider) set by the print director.

After weighing the various non-price parameters offered by each of the bidding document service providers, the print director awards the job of printing the spot volume to one or more of the document service providers according to the non-price parameters, such as their available capacity, geographic location, and/or some of the other mandatory and voluntary non-price parameters.

In this way, both the print director and the print services providers can better meet a variable demand in the market of document services while still maintaining a long-term contractual relationship.

In other embodiments, via a gateway, the print service providers offer printing services for spot volumes at different price schedules with each price corresponding to a set of non-price parameters. The print service providers periodically update their offerings at the gateway. The print director secures printing services for various spot volumes via selecting one or more print service providers according to their posted offerings at the gateway.

These embodiments, and additional embodiments, are described and illustrated in association with FIGS. 1-8.

Figure 1:
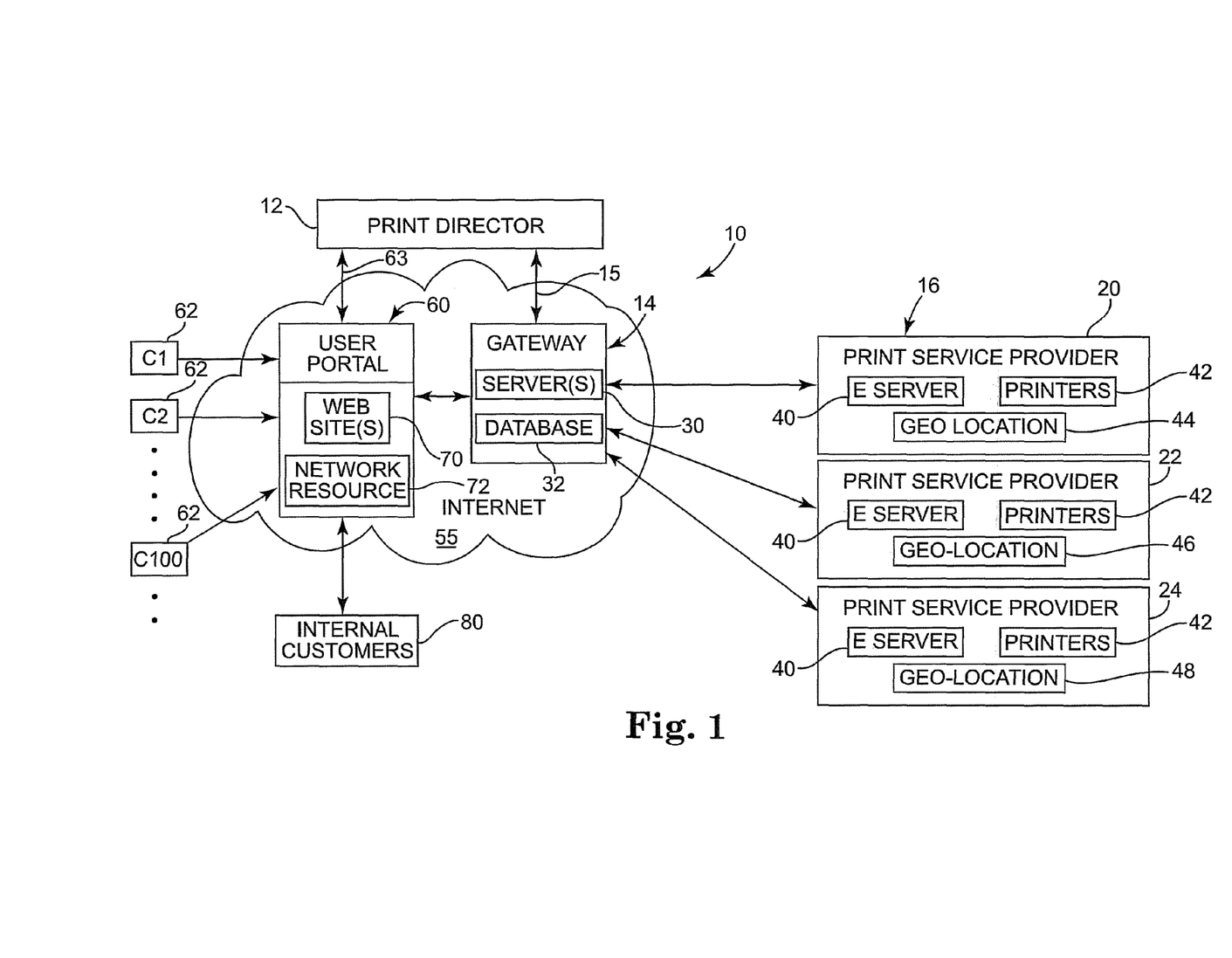
FIG. 1 is a set of block diagrams schematically illustrating a document services acquisition system, according to an embodiment of the present disclosure.

FIG. 1 schematically illustrates a printing services system 10, according to one embodiment of the present disclosure. As shown in FIG. 1, in one embodiment, system 10 includes print director 12, gateway 14, and array 16 of print service providers 20, 22, 24. It will be understood that the term print service provider refers to entities that perform services beyond mere printing and that include other document services. Moreover, it is also understood that the print services providers 20, 22, 24 are not limited in quantity to the three print service providers 20, 22, 24 shown in FIG. 1, as the available print services provider can be more or less than three. Moreover, in some embodiments, at least some of the multiple print service providers 20, 22, 24 comprise independent, unrelated business entities while in other embodiments, the multiple print service provider 20, 22, 24 comprises business entities that are related to each other. The print service providers 20, 22, 24 can have different geographic locations, such as different cities, different states, different countries, or different continents or international regions. Accordingly, together the print service providers 20, 22, 24 can provide (to the print director 12) a state network, a national network, or an international network of service providers.

Print director 12 comprises an entity that requests printing services from the print service providers 20, 22, 24 and that operates gateway 14 as a mechanism to communicate with and transact services (via communication link 15) with the print service providers 20, 22, 24. In some embodiments, gateway 14 is provided by a surrogate of the print director 12 or by a vendor on behalf of print director 12. In either case, gateway 14 is accessible to the print service providers 20, 22, 24 via internet 55 or another network communication pathway.

Each of the print service providers 20, 22, 24 includes one or more printers 42 (or related document handling devices and systems) in order to provide a menu of printing and/or document services. As shown in FIG. 1, in some embodiments, each print service provider 20, 22, 24 comprises an e-server 40 configured to communicate with gateway 14 regarding printing and document requests from customers 62, 80, and print director 12. Each respective print service provider 20, 22, 24 also includes a geographic location identifier 44, 46, 48 which uniquely defines the geographic location or region of the particular provider. As further described later, the proximity of the print services provider 20, 22, 24 relative to the intended recipient is used as one of the factors in determining which of the print service providers 20, 22, 24 will be awarded a spot volume of printing or a part of a spot printing volume by the print director 12.

In some embodiments, system 10 further includes user portal 60 which is configured to communicate and transact with retail customers 62 and/or internal customers 64 to allow those customers to request printing and document services. Print director 12 is in communication with user portal 60 via link 63 and operates user portal 60 to offer printing services. In some embodiments, user portal 60 comprises a web site(s) 70 and/or network resource 72. In particular, in one aspect, network resource 72 provides a mechanism or interface for an employee, manager, business unit, and/or partner of print director 12 to directly access the print services provided by print director 12. In other words, because the print director 12 contracts with the print services providers 20, 22, 24, print director 12 provides network resource 72 to allow its internal customers or clients 80 to use the purchased printing services. However, it is understood that in some embodiments, the network resource 72 takes the form of a web site accessible via the World Wide Web or another network, such as an internal communication network.

In another aspect, web site 70 is configured as a retail web site at which customers 62 access the printing services offered by print director 12 with the printing and/or document services performed by the print service providers 20, 22, 24 on behalf of print director 12. The requested documents are delivered to a location designated by the respective customers.

In one embodiment, in general terms gateway 14 provides a communication venue between print director 12 and the various print service providers 20, 22, 24 and also provides a mechanism to conduct transactions between the print director 12 and print service providers 20, 22, 24. In some embodiments, gateway 14 comprises server(s) 30 and database 32. Among other information, database 32 is configured to store a profile regarding each print service provider 20, 22, 24, as well as store transactional information for each of the print service providers 20, 22, 24. The profiles will be further described later in association with FIG. 4.

Figure 2:
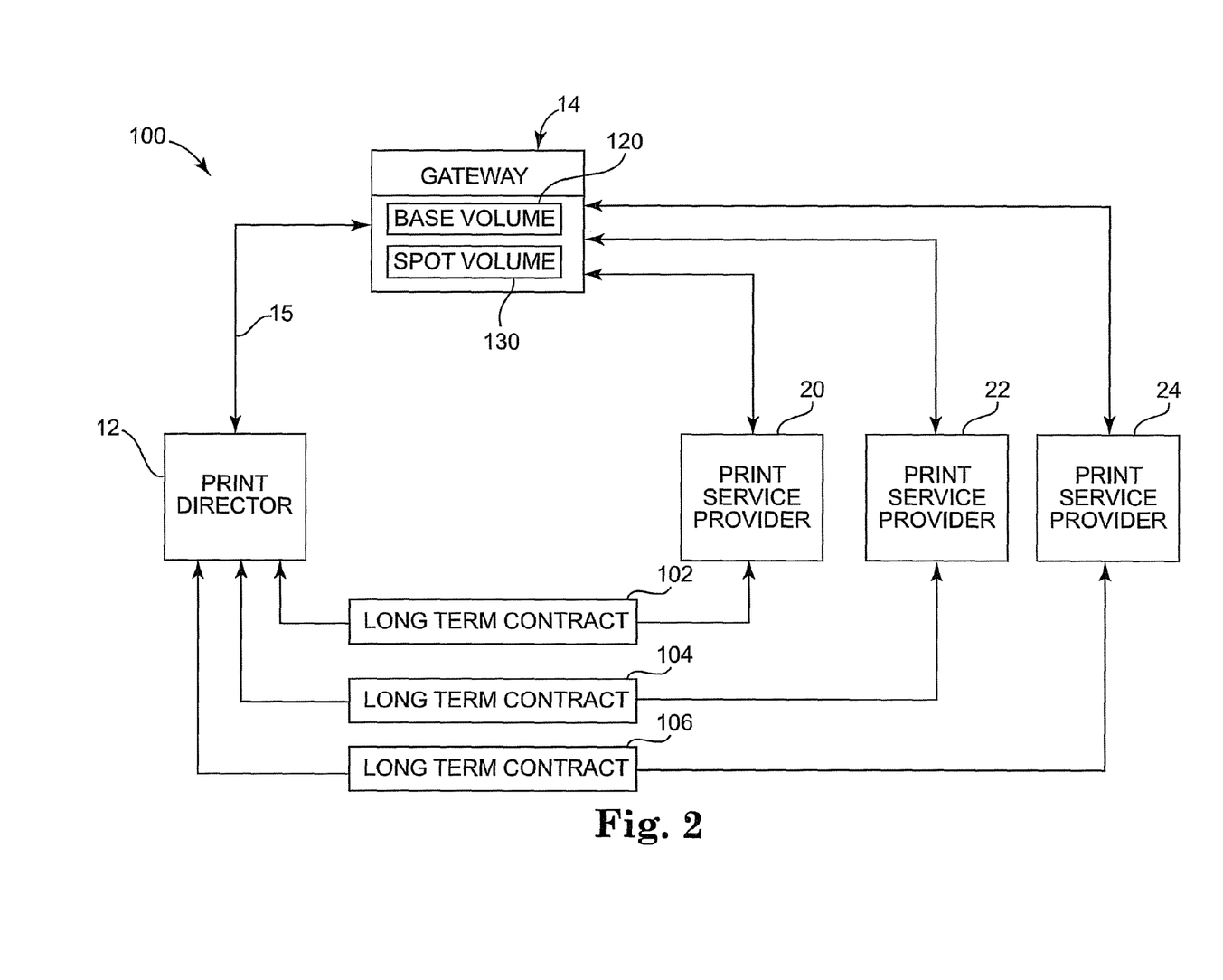
FIG. 2 is a set of block diagrams schematically illustrating a gateway of a document services acquisition system, according to an embodiment of the present disclosure.

FIG. 2 schematically illustrates a document services acquisition system 100, according to one embodiment of the present disclosure. In general terms, document services acquisition system 100 establishes the relationship between the print director 12 and the print service providers 20, 22, 24 relative to a base volume of services and a spot volume of services. As shown in FIG. 2, system 100 includes print director 12, gateway 14, and print service providers 20, 22, 24. In one embodiment, print director 12 has a long term contract 102, 104, 106 with each of the respective print service providers 20, 22, 24. The long term contract 102, 104, 106 governs a large volume of document services provided by the respective print service providers 20, 22, 24. In one non-limiting example, the long term contract specifies that one of the print service providers will annually provide one million printed pages at 10 cents per page. In another aspect, each print service provider 20, 22, 24 individually negotiates with the print director 12 so the terms of the respective long term contracts 102, 104, 106 typically are somewhat different from each other. It is further understood that in some embodiments the contract will cover document services other than merely printing pages. In one aspect, the services under the long term contract are requested and provided via a base volume module 120 of gateway 14.

However, from time to time, the print director 12 requests additional services from print service providers 20, 22, 24 in the form of a spot volume to meet periodic, increased demand from its retail customers 62 or internal customers 80 (FIG. 1) when that demand cannot be met by the base volume under contract. Accordingly, in one embodiment, gateway 14 also provides a spot volume module 130 configured to govern the request from print director 12 for additional services (such as a spot volume of printing) and to govern a process of requesting bids from print service providers 20, 22, 24 to provide those additional services. In one embodiment, the spot volume comprises a volume (e.g., 50,000 pages that is substantially less than the base volume (e.g., 1,000,000 pages). As can be seen from FIG. 2, the spot volume services subject to bidding are provided in addition to the base volume services that are subject to the long term contracts 102, 104, 106.

Figure 3:
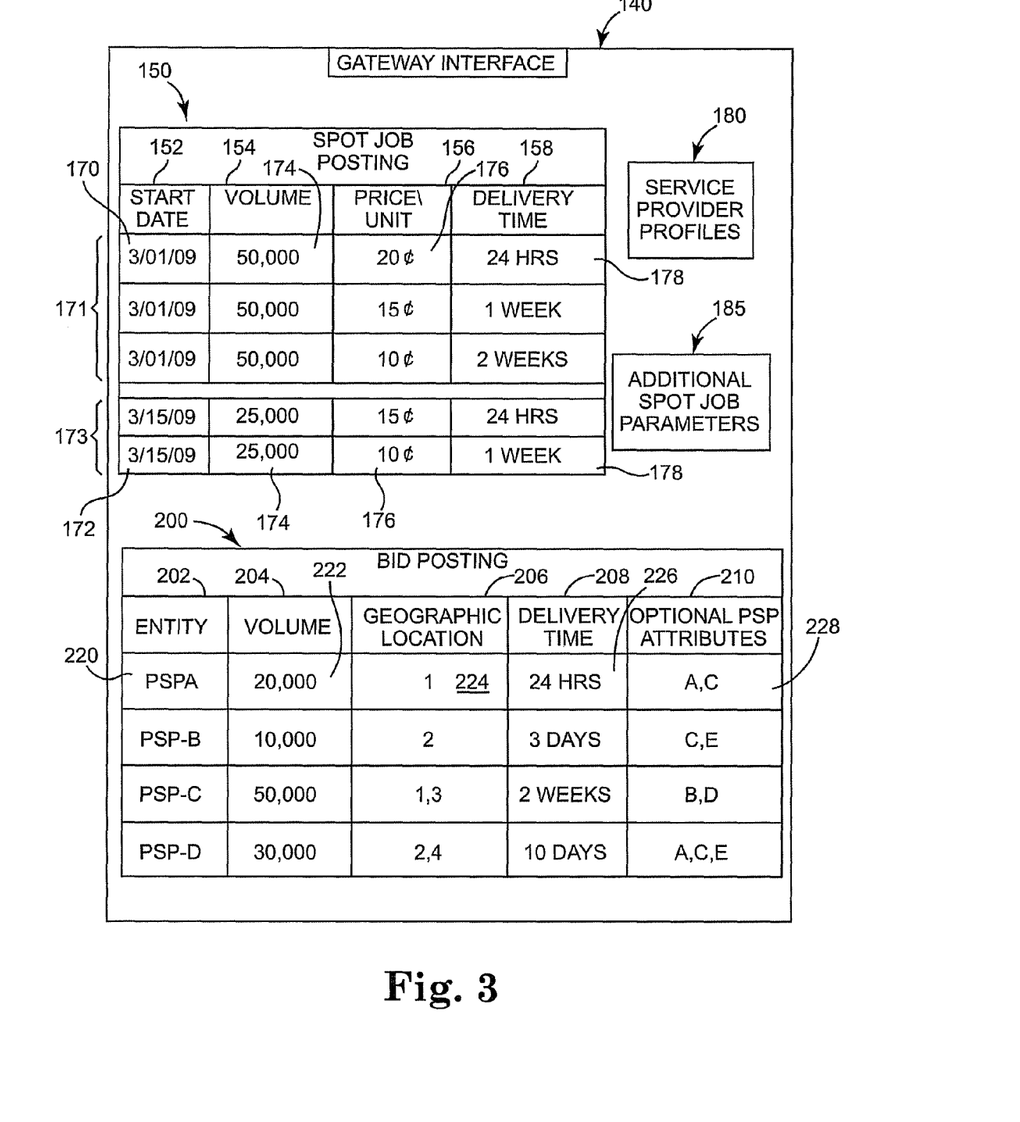
FIG. 3 is a block diagram of a gateway interface, according to an embodiment of the present disclosure.

FIG. 3 is a block diagram of a gateway interface 140, according to one embodiment of the present disclosure. In general terms, gateway interface 140 operates as part of gateway 14 to provide a venue of communication between print director 12 and the print service providers 20, 22, 24 regarding bids on the spot volume of document services requested by print director 12. As shown in FIG. 3, in one embodiment, gateway interface 140 includes spot job posting module 150, service provider profile module 180, additional spot job parameter module 185, and bid posting module 200.

In general terms, spot job posting module 150 comprises a tool used by print director 12 to communicate available print jobs that are part of spot volume 130 of document services requested by print director 12 via gateway 14 (FIG. 2). In some embodiments, spot job posting module 150 comprises a start date parameter 152, a document volume parameter 154, a price parameter 156, and a delivery time parameter 158. In one aspect, start date parameter 152 is configured to specify the date on which a job is available to be started by the print service providers 20, 22, 24 while delivery time parameter 158 specifies the date by which the print job or spot volume is to be provided to the retail customer 62, internal customer 80, or print director 12. In another aspect, volume parameter 154 is configured to specify the volume of pages to be printed or otherwise produced while the price parameter 156 is configured to specify the price set by the print director for providing the services according to the other parameters 152, 154, and 158. It is worth noting that while print service providers 20, 22, 24 are bidding on the posted spot job, the print service providers 20, 22, 24 are not bidding their own price for the job. Rather, the print director 12 sets the price and other basic parameters specific to the job (i.e., job specific constraints) while the print service providers 20, 22, 24 will bid based on non-price factors, as will be further described later in association with bid posting module 200.

In one embodiment, the parameters 152, 154, 156, 158 of the spot job posting module 150 are job specific constraints that the print service providers 20, 22, 24 will have to provide in order to be awarded a spot volume of document services from the print director 12. However, in some embodiments, the print director 12 specifies fewer parameters. In other embodiments, the print director 12 specifies more parameters via additional spot job parameters module 185 such as a type or quality of paper, a type or quality of printer, etc.

With further reference to spot job posting module 150, one non-limiting example of a spot job offered by print director 12 includes an available start date of Mar. 1, 2009 (identifier 170) for a volume of 50,000 pages (identifier 174). If the job is delivered within 24 hours (identifier 178), the print director 12 will pay 20 cents per page (identifier 176) for a volume up to 50,000 pages. However, if the job is delivered within 1 week, the price paid is 15 cents per page while 10 cents per page is paid if the spot volume of 50,000 pages is delivered within 2 weeks. In one embodiment, the document service providers 20, 22, 24 bid on just one price level for a given spot volume. In other embodiments, the document service providers 20, 22, 24 can place a bid for a portion of the spot volume at one price level and bid on a second portion of the spot volume at another price level.

In another aspect, it will be understood in some embodiments, the jobs are awarded as portions of the volume of 50,000 pages such that the three different price levels are not mutually exclusive of each other. In other words, if a portion of 10,000 pages of the requested 50,000 page volume is awarded at 20 cents per page, the remaining 40,000 page volume can be awarded at 15 or 10 cents per page depending upon the offered non-price bids by the print service providers 20, 22, 24.

In addition, as further illustrated by spot job posting module 150, different spot volume requests can be made at the same time. In particular, as shown via identifier 172, a second spot volume request is posted with a start date of Mar. 15, 2009 and with its own job specific constraints. Similar to the previous example, the spot volume of 25,000 pages is offered at multiple price levels depending on the delivery time (i.e. completion date).

With further reference to FIG. 3, in general terms bid posting module 200 is configured to receive and track the non-price bids by the respective print service providers 20, 22, 24 for the various spot job or spot volume services requested by print director 12 via spot job posting module 150. In one embodiment, bid posting module 200 comprises an entity parameter 202, a bid volume parameter 204, a geographic location bid parameter 206, a delivery time bid parameter 208, and optional bid attributes parameter 210. The entity parameter 202 is configured to identify which print service provider 20, 22, 24 is making the bid (e.g. PSP-A at 220) while bid volume parameter 204 is configured to specify the volume of pages (e.g. 20,000 at 222) that the particular entity can produce by the delivery time specified (by the entity) in delivery time bid parameter 208. In some instances, the volume bid by the print service provider 20, 22, 24 equals the full spot volume requested by the print director 12 while in other instances, the volume bid by the print service provider 20, 22, 24 is a portion of the full volume requested. For example, PSPA bids a volume of 20,000 pages which is just a portion of the full volume of 50,000 pages requested by the print director 12 for the spot job with start date of Mar. 1, 2009. While also accounting for other parameters, differences between the requested spot volume and the bid volumes by each print service provider 20, 22, 24 are reconciled via a bid sorter, as further described later in association with FIG. 5.

With further reference to FIG. 3, geographic location bid parameter 206 is configured to track one or more geographic locations at which a given print service provider 20, 22, 24 will perform the requested document services. Each location or geographic region within a state, country, or international area is designated via an alphanumeric code or other symbolic notation. These codes are stored and updated within database 32 (FIG. 1). Moreover, the service provider profile module 180 tracks and stores the geographic locations or regions at which each service provider 20, 22, 24 (or their subparts) are located. The distance between a geographic location of a print service provider 20, 22, 24 and the intended recipient (e.g., retail customer, internal customer, etc.) affects the shipping cost and/or convenience of the intended recipient. In some embodiments, to the extent that a print service provider 20, 22, 24 has multiple, diverse geographic locations (represented by codes 1, 3 for PSP-C or codes 2, 4 for PSP-D) as represented for print service provider PSP-C or PSP-D, this attribute may favor awarding the spot volume to those print service providers PSP-C or PSP-D because those service providers will be more likely to meet the requested delivery times in more than one location.

Optional attributes parameter 210 is configured to track additional attributes that the print service provider can voluntarily provide in addition to the mandatory attributes specified in the spot job posting by the print director 12 and in addition to the mandatory attributes to be met by each print service provider 20, 22, 24. As shown in FIG. 3, each different optional or voluntary attribute is represented by a code (identifier 228), such as an alphanumeric identifier or other symbol. These codes are assigned to each service provider profile and stored via service provider profile module 180 (FIG. 3). These additional attributes are further described later in association with FIG. 4.

Figure 4:
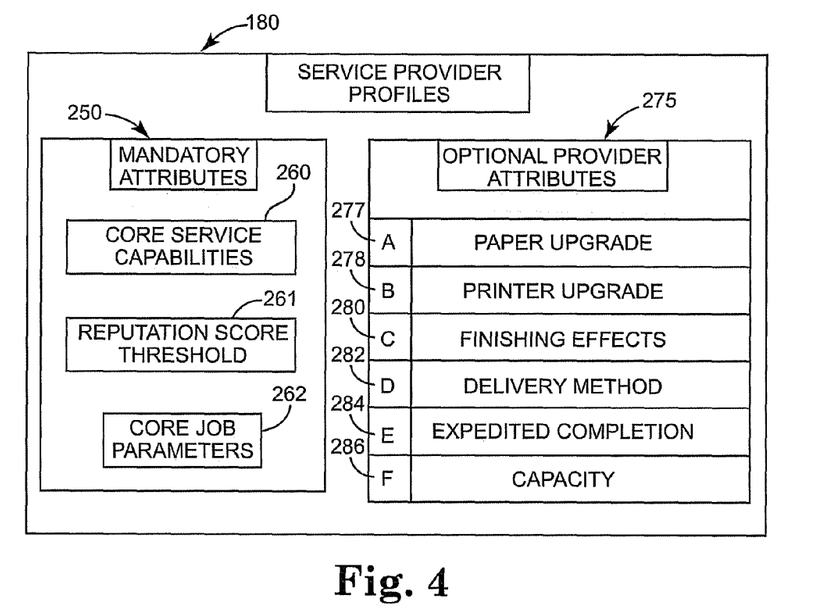
FIG. 4 is a block diagram of a service provider profile module, according to an embodiment of the present disclosure.

FIG. 4 is a block diagram schematically illustrating a service provider profile module 180, according to one embodiment of the present disclosure. In one embodiment, service provider profile module 180 comprises at least substantially the same features and attributes as service provider profile module 180 that was previously described in association with FIG. 3. As shown in FIG. 4, service provider profile module 180 comprises a provider mandatory attributes module 250 and an optional provider attributes module 275.

In general terms, the mandatory attributes module 250 is configured to specify the requirements to be met by the print service providers 20, 22, 24 in order to qualify the service providers to participate in the bidding on the spot volume as well as to specify the job specific constraints for the particular spot volume. In one embodiment, the provider mandatory attributes module 250 comprises a core capabilities module 260, a reputation score module 261, and/or a core job parameters module 262.

In one aspect, the core capabilities module 260 is configured to specify basic capabilities to be met by each print service provider 20, 22, 24 in order to participate in bidding on a spot volume. In one embodiment, the core capabilities are substantially the same as the core capabilities established via the long term contracts 102, 104, 106. In other embodiments, print director 12 sets core capabilities different from those set forth in the long term contracts 102, 104, 106. In one non-limiting example, a set of core capabilities includes a minimum type or quality of paper, a minimum type or quality of printer, minimum finishing effects, and/or minimum delivery methods, etc.

The reputation score threshold module 260 is configured to track a reputation score for each print service provider 20, 22, 24 (FIG. 1). The reputation score is earned via feedback provided to print director 12 from retail customers 62 or internal customers 80 (via user portal 60) based on their experience in receiving document services from the print services provider 20, 22, 24. The reputation score is regularly updated as the document services are delivered to the respective customers. In addition, in some embodiments, print director 12 adds its own feedback regarding the performance of a print service provider 20, 22, 24 based on the quality of the print director's interaction with the print service provider 20, 22, 24 (e.g., the manner of performance of the long term contract or spot volume work by the respective print service provider) or based on other information such as surveys or print services industry ratings.

In some embodiments, the print director 12 sets a threshold of a minimum reputation score. Print service providers 20, 22, 24 failing to meet the threshold will not be permitted to place bids on the spot job or spot volume posting by the print director 12 or alternatively, their bids will be rejected or scored lower than other print service providers. However, it is understood that the underlying long term contract may still remain despite the disqualification from placing a bid on a spot job or spot volume.

The core job parameters module 262 is configured to enable the print director 12 to specify the core constraints of the spot job or spot volume. In one embodiment, most, if not all, of these core constraints or requirements are posted as part of the spot job posting in spot job posting module 150 of gateway interface, as shown in FIG. 3. For example, in some embodiments, the core constraints for a job tracked by module 262 (and posted by print director 12) are shown in FIG. 3. These job specific constraints illustrated in FIG. 3 include, but are not strictly limited to, a start date (identifiers 152, 170), a volume (identifiers 154, 174), and a delivery time (identifiers 158, 178). These job specific constraints will have to be met by the bidding print service providers 20, 22, 24 and cannot be altered by the print service providers 20, 22, 24 in their bids. Moreover, the price per unit (identifiers 156, 176) is necessarily a job specific constraint or core constraint because the price is set by the print director and is not negotiable.

The optional provider attributes module 275 tracks values of the optional (e.g. voluntary) attributes parameters 210 provided in a bid posted by the service providers via bit posting module 200 (FIG. 3). These attributes are features (in addition to the mandatory attributes and core job requirements) that a print service provider 20, 22, 24 voluntarily chooses to offer as part of a bid to potentially enhance their bid on the posted A few non-limiting examples of the optional or voluntary attributes that can be associated with a print service provider 20, 22, 24 include a paper upgrade parameter 277, a printer upgrade parameter 278, a finishing effect parameter 280, and a delivery method parameter 282, an expedited completion parameter 284, and an available capacity parameter 286. However, this list of optional or voluntary attribute parameters is not exhaustive, as fewer or greater number of parameters may be included. Accordingly, the respective parameters 277, 278, 280, 282, 284, 286 of module 275 enable the print service provider 20, 22, 24 to offer a higher quality paper, a higher quality printer, a higher quality or different finishing effects, and/or better delivery method, etc. than the respective minimum job specific constraints or core capabilities for these features. Finally, as previously mentioned, each different attribute of the parameters 277, 278, 280, 282, 284, and 286 is represented by a code (e.g., A, B, C, D, E, etc.) which is entered by the print service provider in the bid posting module 200 (FIG. 3).

Figure 5:
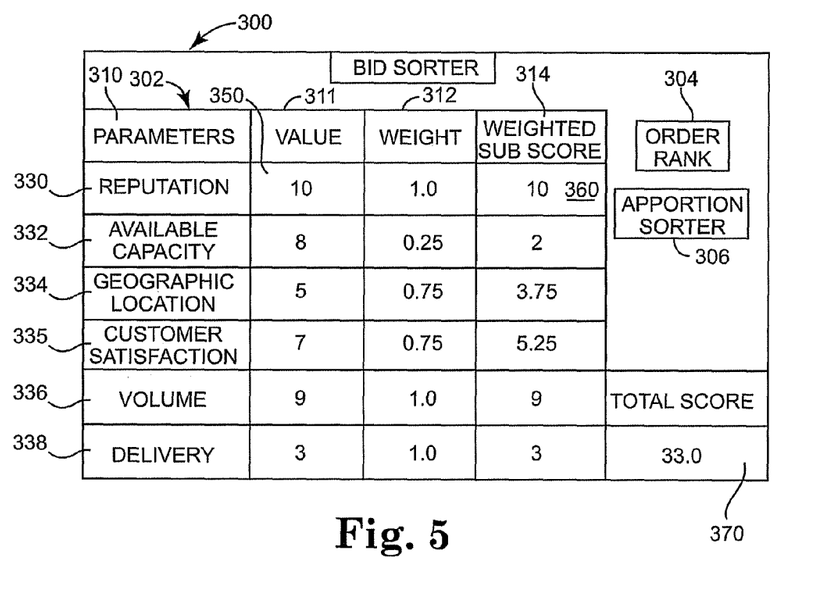
FIG. 5 is a block diagram of a bid sorter module, according to an embodiment of the present disclosure.

FIG. 5 is a block diagram schematically illustrating a bid sorter module 300, according to one embodiment of the present disclosure. In general terms, bid sorter module 300 is configured to enable print director 12, via gateway 14, to automatically sort out the bids from the print service providers 20, 22, 24 according to the non-price parameters specified by the print service providers 20, 22, 24. In the example illustrated in FIG. 5, just one bid from a print service provider is shown. However, it is understood that bid sorter module 300 is configured to simultaneously sort multiple bids if they are available.

As shown in FIG. 5, in one embodiment bid sorter module 300 comprises parameters column 310, provider value column 311, weighting column 312, and weighted subscore column 314. The parameters column 310 lists at least some of the core capabilities, core job constraints, and/or optional attributes desired to be included by the print director 12. In one embodiment, these attributes and constraints include one or more of a reputation parameter 330, an available capacity parameter 332, a geographic parameter 334, a composite satisfaction parameter 335, a volume parameter 336 and a delivery parameter 338. In one aspect, the composite satisfaction parameter 335 tracks the cumulative (or recent) feedback from customers 62, 80 (FIG. 1) regarding their interaction with the particular service provider. This parameter 335 is somewhat different than the reputation parameter 330 because, in one embodiment, the composite satisfaction parameter 335 focuses exclusively on customer feedback. In some embodiments, this customer satisfaction information is accessible to the customer via user portal 60 (e.g. web site 70).

In one embodiment, for each print service provider, a score is provided in values column 311 for each of the respective parameters 330, 332, 334, 336, 338 in parameters column 310. In one aspect, the print director 12 determines a scale (e.g., 1 to 10, with 10 the highest) on which the various parameters are scored and the print director 12 (automatically via gateway 14 or manually) assigns a particular score for each parameter for a given print service provider 20, 22, 24. For example, a score of 5 for the geographic location is based on the distance of the bidding service provider relative to the intended recipient. It is further understood that other methodologies familiar to those skilled in the art are available to assign a score to the respective parameters 330, 332, 334, 336, 338.

Each score of a particular parameter is also given a weighting according to the relative importance that the print director 12 chooses to assign that parameter for the particular spot job or spot volume being requested. For example, in one sample spot job or spot volume, when the print director 12 wants to maximize the likelihood of a superior experience by the customers, the reputation is weighed most heavily, and therefore is given a score of 1.0. In some embodiments, bid sorter 300 is configured to weigh a mandatory parameter with a weight of 1.0. It is also understood that bid sorter module 300 can use other weighting mechanisms or schemes familiar to those skilled in the art.

In column 314 of bid sorter module 300, each parameter 330, 332, 334, 336, 338 receives a subscore (identifier 360) based on the particular assigned value and weighting of each parameter. A total score (identifier 370) is determined from all the weighted subscores and recorded for each print service provider 20, 22, 24 for this particular spot job.

It will be understood that in some embodiments, methodologies different than those depicted in FIG. 5 can be employed to provide a score for each print service provider 20, 22, 24 based on their ability to meet the mandatory provider attributes (e.g. core capabilities), core job constraints, and/or optional additional attributes offered by the print service provider 20, 22, 24.

In some embodiments, bid sorter module 300 also comprises an order rank function 304. In one embodiment, order rank function 304 is configured to rank the print service providers 20, 22, 24 according to their total scores. In other embodiments, order rank function 304 enables the print director 12 (via gateway 14) to rank the print service providers on a parameter-by-parameter basis so that the ranking can be observed for each parameter. For example, the print director 12 may want to observe the weighted or non-weighted ranking of service providers by their available capacity 332 without regard to the other parameters. Moreover, in some embodiments, the print director 12 can assert their discretion to override the total score mechanism to award a spot job or spot volume based on one or more of the parameters when the ranking is viewed on a parameter-by-parameter basis.

In some embodiments, bid sorter module 300 includes an apportion sorter function 306 that is configured to apportion a spot job or spot volume into subjobs among multiple print service providers. In one aspect, the apportion sorter function 306 acts in cooperation with the order rank function 304 so that the top two or three scoring (or some other number) print service providers receive some portion of the total spot volume requested. Here, the rank is produced based on a total score or alternatively based on a rank of one or more individual parameters.

In one scenario, when the spot volume is greater than the available capacity of the top ranked print service provider, then the remaining portion of the spot volume is assigned to the next ranked print service providers (according to their available capacity) until the entire requested spot volume is apportioned. Alternatively, in another scenario, when the requested spot volume is less than the available capacity of the print service providers, the spot volume is not apportioned at all or may still be apportioned based on other factors such as reputation, geographic location, etc.

Figure 6:
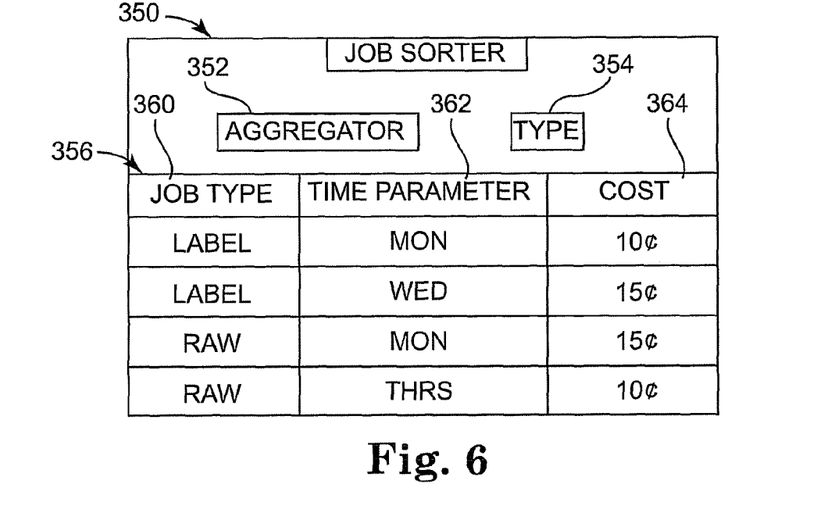
FIG. 6 is a block diagram of a job sorter module, according to an embodiment of the present disclosure.

FIG. 6 is a block diagram schematically illustrating a job sorter module 350, according to one embodiment of the present disclosure. In one embodiment, a customer job sorter module 350 comprises an additional component of gateway 14 (FIGS. 1-2) and/or gateway interface 140 (FIG. 3). As shown in FIG. 6, customer job sorter 350 comprises an aggregator function 352, a customer job type function 354, and a customer interface 356. The customer job type function 354 is configured to sort job requests from customers made at user portal 60 (e.g., at web site 70) and assign each job request as one job type of an array of job types. For example, a requested job could comprise printing labels while other jobs could comprise printing photos or simply printing paper document (e.g., raw printing). In this way, the print director 12 assesses which types of jobs are being requested and utilizes the aggregator function 352 to aggregate similar job requests according to their respective job types. This aggregation, in turn, helps the print director 12 to recognize how to group similar job requests into one or more of spot volumes to be requested from the print service providers 20, 22, 24.

Once this sorting and aggregation has taken place, the print director 12 manipulates gateway interface 140 to provide a customer interface 356 configured to be accessible to customers via user portal 60 (FIG. 1). In one embodiment, customer interface 356 is in communication with the gateway interface 140 and is configured to provide a menu of different job types 360. Each job type is associated with different price levels (as represented via cost parameter) depending upon the time period at which the job is requested (or alternatively, the time period to be completed), as tracked via time parameter 362. In one aspect, the time parameter 362 tracks a day of the week (e.g., Monday, Tuesday, Wednesday, etc.), although other measures of time can be used to sort the job types. The different price schedules available to the customer via customer interface 356 reflect the different spot volumes requested by the print director 12 via gateway interface relative to the print service providers 20, 22, 24, as previously described.

Accordingly, in the illustrated example, better pricing is available to the customer for a label order placed on Monday (e.g., 10 cents) than placed on Wednesday (e.g., 15 cents). However, better pricing is available to the customer for a raw printing order placed on Thursday (e.g., 10 cents) than placed on Monday (e.g., 15 cents). It will be understood that these different pricing levels at customer interface 356 for the same type job reflect the behind-the-scenes dynamics at gateway 14 and gateway interface 140 between the print director 12 and the print service providers 20, 22, 24 as the print director 12 acquires services for spot volumes of printing.

Customer interface 356 effectively brings some transparency to the spot volume market and variability in pricing of services and allows the customer to benefit from these dynamics via the ability to place an order at a time or on a day of the week that has the lowest price.

It will be further understood that in some embodiments, customer interface 356 lists other non-price parameters associated with each pricing level so that the customer can further adjust their demands or job request in accordance with the relative cost of the particular non-price parameters according to the spot volume market between the print director 12 and the various print service providers 20, 22, 24.

Figure 7:
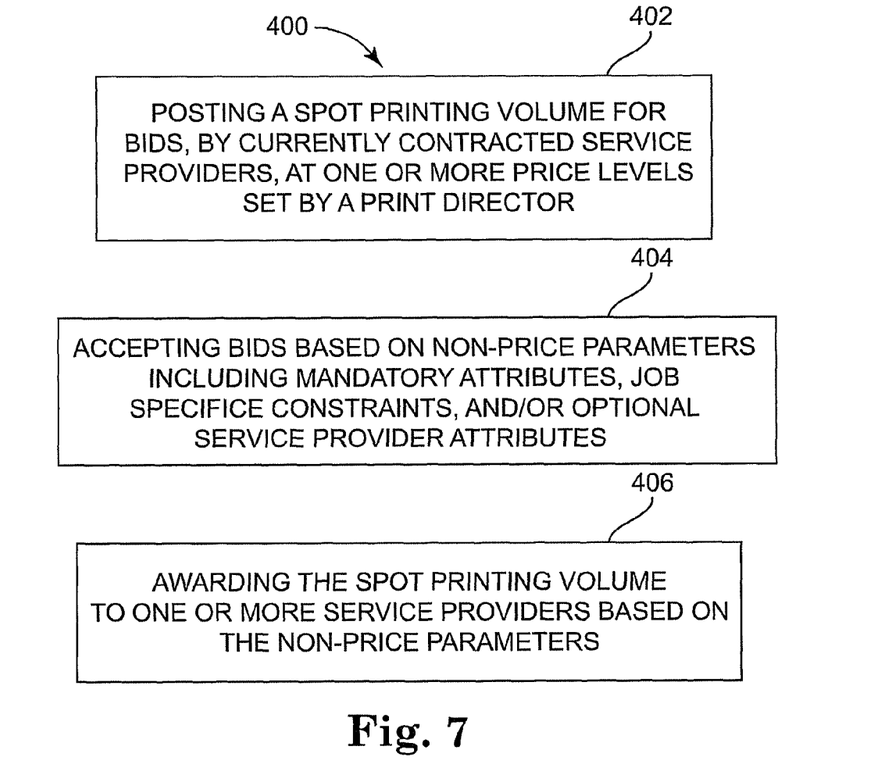
FIG. 7 is a flow diagram of a method of acquiring document services, according to an embodiment of the present disclosure.

FIG. 7 is a flow diagram of a method 400 of acquiring document services, according to one embodiment of the present disclosure. In one embodiment, method 400 is performed via the systems and components previously described in association with FIGS. 1-6. However, in some embodiments, method 400 is performed using other systems and components.

As shown in FIG. 7, at 402 method 400 includes posting a spot volume for bids, to currently contracted service providers, at one or more price levels set by the requester. At 404, method 400 includes accepting based bids from the respective service providers based on non-price parameters including (but not limited to) mandatory attributes, job specific constraints, and/or optional attributes offered by the service providers. At 406, method 400 includes awarding the spot printing volume according to an assigned score based on the non-price parameters.

Figure 8:
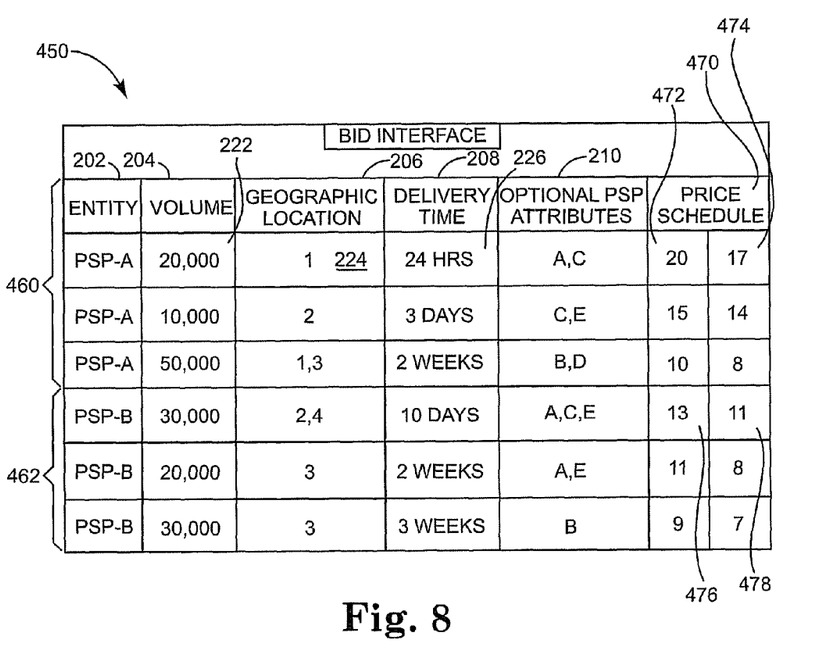
FIG. 8 is a block diagram of a bid interface module, according to an embodiment of the present disclosure.

FIG. 8 is a block diagram schematically illustrating a bid interface module 450, according to one embodiment of the present disclosure. In general terms, bid interface module 450 forms part of a system substantially similar to the systems 10, 100 as previously described in association with FIGS. 1-7, except that in this embodiment, bid interface module 450 generally replaces spot job posting module 150 and bid posting module 200 of gateway interface 140 (FIG. 3). Instead, in this embodiment, gateway interface 140 includes a bid interface module 450, as shown in FIG. 8. However, it is understood that gateway interface 140 retains at least service provider profiles 180 and additional spot job parameters module 185.

In this embodiment, in general terms the gateway interface 140 (FIG. 3) modified via bid interface 450 of FIG. 8 is configured to allow print director 12 to notify print service providers 20, 22, 24 of general parameters of performing spot volume printing services for print director 12. However, instead of print director 12 setting the price levels, the print service providers 20, 22, 24 utilize the bid interface 450 of modified gateway interface 140 to offer printing services for spot volumes at different price schedules with each price corresponding to a set of non-price parameters. The print service providers 20, 22, 24 periodically update their offerings at bid interface 450 of the modified gateway interface 140. The print director 12 secures printing services for various spot volumes via selecting one or more print service providers 20, 22, 24 according to their posted offerings at the gateway.

With these general principles of the present disclosure in mind and with further reference to FIG. 8, bid interface 450 comprises at least substantially the same features and format as bid posting module 200 (FIG. 3) except further including a price schedule function 470. Via price schedule function 470, each print service provider 20, 22, 24 offers one or more price schedules for their services. In one example, one print service provider (represented by PSP-A) offers a services listing 460 according to a first price schedule 472 (e.g., 20 cents/page, 15 cents/page, and 10 cents/page, respectively) and a second price schedule 474 (e.g., 17 cents/page, 14 cents/page, and 8 cents/page, respectively). In one embodiment, the first price schedule 472 corresponds to services including the optional or voluntary attributes (e.g., A, C or C, E, or B,D) at the different offered printing volumes (e.g., 20,000, 10,000, or 50,000, respectively) while the second price schedule 474 corresponds to services omitting the optional attributes for each offered printing volume. However, in other embodiments, other factors or parameters determine the differences between the first and second price schedules 472, 473. Moreover, the print service provider PSP-A can offer more or less than two price schedules.

Because several print service providers are typically competing to provider services for a print director, bid interface 450 of FIG. 8 also illustrates a services listing 462 offered by print service provider PSP-B via bid interface 450 according to a first price schedule 476 and a second price schedule 478.

As spot volumes of printing services are needed by print director 12 (FIG. 2), print director 12 reviews the offered services posted in bid interface 450 of the modified gateway interface 140 and awards the one or more spot volumes of printing to one or more service providers. In one aspect, a single spot volume of printing requested by print director can be apportioned among different service providers via selecting or accepting multiple complementary offers via bid interface 450. In one embodiment, the sorting process occurs manually while in other embodiments, the sorting process is performed via bid sorter module 300 (FIG. 5) in a manner substantially the same as previously described. However, in this instance, because the print director 12 is not initially setting the price schedules, the bid sorter module 300 will also include price as one of the several parameters evaluated in determining which print service provider will be awarded a spot volume of printing.

In one aspect, print service providers such as PSP-A or PSP-B (also represented via 20, 22, 24 in FIG. 1) periodically update their services listing 460 or 462 posted at bid interface 450. The service listings are updated weekly, monthly, quarterly and/or by a time interval set by the respective service provider. In one embodiment, the updating occurs via print service provider profile module 180 of the modified gateway interface 140 (see, for example, gateway interface 140 of FIG. 3).

Some embodiments of the present disclosure provide a gateway to enable a print director to secure or acquire spot volumes of printing and document services from print service providers via a bidding system that allows the print director to set price levels and receive bids based on non-price parameters. In other embodiments, via a gateway, each print service provider offers (to a print director) a price schedule for spot volumes of printing with the price schedule being updated on a periodic basis. The print director dynamically sorts the various price schedules and pertinent non-price parameters provided by the roster of print service providers, and then the print director then accepts one or more offers from the print service providers in order to receive printing services for a spot volume of printing.

With either one of these acquisition systems, more jobs are printed on demand via the spot volume bidding price and at an overall lower price because the pricing occurs on the spot market instead of via the long term contracts. Moreover, with the diverse locations available through the many different service providers, printing can be performed closest to the recipient, thereby saving transportation costs and alleviating environmental impact.

Although specific embodiments have been illustrated and described within the present disclosure, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A document services acquisition system, comprising:
 a network gateway configured to provide communication between a print director and an array of print service providers, the network gateway including:
  a spot job posting module configured to post a spot volume of printing requested by the print director and including:
   a price function configured to post at least one schedule of different price levels for the spot volume; and
   an attributes function configured to post at least one non-price parameter, of an array of non-price parameters, in association with each different price level; and
  a sorter module configured to award the spot volume to at least one of the print service providers.

2. The system of claim 1 wherein the print director and the print service provider have a pre-existing contractual relationship;
 wherein the spot job posting module includes a bid interface configured to determine, by instruction of the print director, the spot volume and the at least one schedule of price levels and to select which of the at least one non-price parameter that is associated with different respective price levels for the spot volume; and wherein the sorter is configured to award the spot volume based on the selected non-price parameters.

3. The system of claim 1, wherein the spot job posting module includes a bid interface configured to receive periodic bids from service providers, each bid including the at least one schedule of price levels according to the price function and at least one non-price parameter according to the attributes function, and wherein the sorter is configured to track the periodic bids and award the spot volume based on a comparison of the periodic bids from different service providers.

4. The system of claim 1 wherein the non-price parameters include at least one mandatory attribute of respective service providers and at least one job specific constraint.

5. The system of claim 4 wherein the at least one mandatory attribute includes at least one of:
a reputation parameter; and
a core capability parameter including at least one of a minimum paper quality or a minimum printer type.

6. The system of claim 4 wherein the at least one job specific constraint includes at least one of a delivery time parameter, a volume parameter, a start date parameter, and an available capacity parameter.

7. The system of claim 4 wherein the non-price parameters include voluntary attribute parameters including at least one of a paper upgrade parameter, a printer upgrade parameter, a finishing effect parameter, a delivery method upgrade parameter, or an expedited completion parameter.

8. The system of claim 1 wherein the sorter comprises at least one of:
a scoring module configured to assign a score to each print service provider according the non-price parameters including at least one of a reputation parameter, an available capacity parameter, a geographic location parameter, a bid volume parameter, and a bid delivery parameter, wherein the scoring module includes a weighting mechanism to selectively apply different amounts of weight to each of the different respective non-price parameters;
an order ranking module configured to automatically rank the order of service providers based on their assigned scores;
an apportion sorter configured to divide the spot volume of the spot job among multiple service providers when the spot volume exceeds the available capacity of higher ranked service providers.

9. The system of claim 1, wherein the gateway comprises a customer job sorter, including:
a customer job type function configured to sort job requests from customers and assign each job request as one job type of an array of job types;
an aggregation function configured to aggregate job requests according to their respective job types; and
a customer interface configured to be accessible to customers via a customer portal in communication with the gateway, wherein the customer interface is configured to provide a menu of different job types and each job type is associated with different price levels according to a time parameter.

10. A method of acquiring document services, the method comprising:
posting, via a spot job posting module, a spot job from a printing director, via a gateway interface, to an array of printing service providers, each service provider having a pre-existing long term service contract with the printing director, wherein the spot job includes a first volume of printing associated with at least one price level set by the printing director;
accepting, via a bid posting module, non-price bids for the spot job from the service providers at the gateway interface based on non-price parameters including at least one mandatory parameter and at least one non-mandatory parameter; and
awarding, via a bid sorter module, the spot job to at least one of the service providers based on a score, assigned by the printing director, of respective mandatory and non-mandatory parameters for each service provider.

11. The method of claim 10 wherein the first volume of printing of the spot job is substantially less than a printing volume of long term contract printing service contract.

12. The method of claim 10 wherein the first volume of printing of the spot job is apportioned among multiple service providers according to their relative scores.

13. A document services acquisition gateway, comprising:
a spot job posting module for posting a spot job of a first volume of printing associated with one or more one price levels set by a requester;
a bid posting module for accepting bids for the spot job from service providers based on non-price parameters; and
a bid sorter module for sorting the bids and awarding the spot job, based on the non-price parameters, to at least one service provider at one of the price levels.

14. The gateway of claim 13 wherein the spot job posting module is configured to specify for the spot job at least one of start date parameter, a volume parameter configured to specify the first volume, a price per unit parameter, and a delivery time parameter.

15. The gateway of claim 13 wherein the bid posting module is configured to receive at least one of a bid volume, a bid geographic location, a bid delivery time, and a bid available capacity.

* * * * *